United States Patent
Ghobadzadeh et al.

(10) Patent No.: US 10,872,258 B2
(45) Date of Patent: Dec. 22, 2020

(54) ADAPTIVE IMAGE CROPPING FOR FACE RECOGNITION

(71) Applicants: Ali Ghobadzadeh, North York (CA); Juwei Lu, North York (CA); Richard Patrick Wildes, Toronto (CA); Wei Li, Markham (CA)

(72) Inventors: Ali Ghobadzadeh, North York (CA); Juwei Lu, North York (CA); Richard Patrick Wildes, Toronto (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 16/355,665

(22) Filed: Mar. 15, 2019

(65) Prior Publication Data

US 2020/0293807 A1    Sep. 17, 2020

(51) Int. Cl.
| | | |
|---|---|---|
| G06K 9/32 | (2006.01) | |
| G06N 3/08 | (2006.01) | |
| G06K 9/62 | (2006.01) | |
| G06K 9/00 | (2006.01) | |
| G06N 3/04 | (2006.01) | |

(52) U.S. Cl.
CPC .......... *G06K 9/32* (2013.01); *G06K 9/00228* (2013.01); *G06K 9/00268* (2013.01); *G06K 9/6217* (2013.01); *G06N 3/04* (2013.01); *G06N 3/084* (2013.01)

(58) Field of Classification Search
CPC .. G06K 9/32; G06K 9/00228; G06K 9/00268; G06K 9/6217; G06N 3/04; G06N 3/084
See application file for complete search history.

(56) References Cited

U.S. PATENT DOCUMENTS

| | | | |
|---|---|---|---|
| 7,054,468 B2 | 5/2006 | Yang | |
| 7,515,740 B2 | 4/2009 | Corcoran et al. | |
| 10,268,950 B2 * | 4/2019 | Yin | G06N 3/0454 |
| 10,713,794 B1 * | 7/2020 | He | G06T 7/11 |
| 10,726,305 B2 * | 7/2020 | van Rensburg | G06K 9/00288 |
| 2008/0089579 A1 | 4/2008 | Han et al. | |
| 2015/0347822 A1 * | 12/2015 | Zhou | G06K 9/00248 |
| | | | 382/118 |
| 2016/0275341 A1 * | 9/2016 | Li | G06K 9/4642 |
| 2016/0379041 A1 | 12/2016 | Rhee et al. | |

(Continued)

FOREIGN PATENT DOCUMENTS

| | | | |
|---|---|---|---|
| CN | 105069400 A | * | 11/2015 |
| CN | 107368886 A | | 11/2017 |

(Continued)

OTHER PUBLICATIONS

V. M. P. A. Kumar, R. Ranjan and R. Chellappa. Face align-ment by local deep descriptor regression. CoRR, 2016 2016.

(Continued)

*Primary Examiner* — Utpal D Shah

(57) ABSTRACT

By adding a side network to a face recognition network, output of early convolution blocks may be used to determine relative bounding box values. The relative bounding box values may be used to refine existing boundary box value with an eye on improving the generation, by the face recognition network, of embedding vectors.

20 Claims, 7 Drawing Sheets

(56) References Cited

U.S. PATENT DOCUMENTS

| | | | |
|---|---|---|---|
| 2017/0046563 | A1 | 2/2017 | Kim et al. |
| 2017/0147905 | A1* | 5/2017 | Huang ................ G06K 9/6232 |
| 2017/0262695 | A1 | 9/2017 | Ahmed |
| 2018/0032840 | A1* | 2/2018 | Yu ............................ G06N 3/08 |
| 2018/0068198 | A1* | 3/2018 | Savvides ............. G06K 9/6274 |
| 2018/0150681 | A1 | 5/2018 | Wang et al. |
| 2018/0150684 | A1* | 5/2018 | Wang .................. G06K 9/6256 |
| 2019/0026538 | A1* | 1/2019 | Wang .................. G06K 9/4642 |
| 2019/0057507 | A1* | 2/2019 | El-Khamy ............. G06T 11/60 |
| 2019/0095703 | A1 | 3/2019 | Das et al. |
| 2019/0114824 | A1* | 4/2019 | Martinez .................. G06T 7/50 |
| 2019/0171908 | A1* | 6/2019 | Salavon ................ G06N 3/084 |
| 2019/0213474 | A1* | 7/2019 | Lin ...................... G06F 16/784 |
| 2019/0228215 | A1* | 7/2019 | Najafirad ........... G06K 9/00302 |
| 2019/0370532 | A1* | 12/2019 | Soni .......................... G06N 3/08 |
| 2020/0034605 | A1* | 1/2020 | Manaharlal Kakkad .................... G06K 9/00771 |
| 2020/0104570 | A1* | 4/2020 | Kumar ............... G06K 9/00302 |

FOREIGN PATENT DOCUMENTS

| | | |
|---|---|---|
| CN | 104866810 | 7/2018 |
| CN | 108734300 A | 11/2018 |

OTHER PUBLICATIONS

K. Y. A. Newell and J. Deng. Stacked hourglass networks for human pose estimation. Springer International Publishing, pp. 483-499, 2016 2016.

A. Bansal, C. Castillo, R. Ranjan, and R. Chellappa. The dos and donts for cnn-based face verification. 2017 IEEE In-ternational Conference on Computer Vision Workshops (IC-CVW), pp. 2545-2554, 2017 2017.

V. Belagiannis and A. Zisserman. Recurrent human pose estimation. 12th IEEE International Conference on Automatic Face Gesture Recognition (FG 2017), pp. 468-475, 2017 2017.

A. Bulat and G. Tzimiropoulos. Convolutional aggregation of local evidence for large pose face alignment. Proceedings of the British Machine Vision Conference (BMVC) 2016.

A. Bulat and G. Tzimiropoulos. Human pose estimation via convolutional part heatmap regression. Springer Inter-national Publishing, pp. 717-732, 2016 2016.

A. Bulat and G. Tzimiropoulos. Binarized convolutional landmark localizers for human pose estimation and face alignment with limited resources. The IEEE International Conference on Computer Vision (ICCV), 2017. 2017.

V. V. A. A. A. C. Szegedy, S. Ioffe. Inception-v4, inceptionresnet and the impact of residual connections on learning. Proceedings of the Thirty-First AAAI Conference on Artificial Intelligence (AAAI-17), pp. 4278-4284, 2017 2017.

A. K. R. Chellappa. Disentangling 3d pose in a dendritic cnn for unconstrained 2d face alignment. CVPR, pp. 430-439, 2018 2018.

D. K. F. Schroff and J. Philbin. Facenet: A unified embedding for face recognition and clustering. In Conference on Computer Vision and Pattern Recognition (CVPR), 2015 2015.

T. B. G. B. Huang, M. Ramesh and E. Learned-Miller. Labeled faces in the wild: A database for studying face recognition in unconstrained environments. In Technical Report 07-49, University of Massachusetts, Amherst, 2007 2007.

Z. Z. X. J. D. G. J. Z. Z. L. H. Wang, Y. Wang and W. Liu. Cosface: Large margin cosine loss for deep face recognition. In Conference on Computer Vision and Pattern Recognition (CVPR), 2018 2018.

E. Hoffer and N. Ailon. Deep metric learning using triplet network. In International Workshop on Similarity-Based Pattern Recognition, 2015 2015.

D. M. I. Kemelmacher-Shlizerman, S. M. Seitz and E. Brossard. The megaface benchmark: 1 million faces for recognition at scale. In Conference on Computer Vision and Pattern Recognition (CVPR), 2016. 2016.

M. K. J. Zhang, S. Shan and X. Chen. Coarse-to-fine autoencoder networks (cfan) for real-time face alignment. ECCV, 2014 2014.

Z. L. K. Zhang, Z. Zhang and Y. Qiao. Joint face detection and alignment using multi-task cascaded convolutional networks. Signal Processing Letters, 23(10):1499-1503, 2016 2016.

I. K. K. M. L. Chen, G. Papandreou and A. L. Yuille. Semantic Image segmentation with deep convolutional nets and fully connected crfs. CoRR, pp. 1-10, 2014 2014.

I. K. K. M. L. Chen, G. Papandreou and A. L. Yuille. Semantic image segmentation with deep convolutional nets and fully connected crfs. CoRR, 2014 2014.

J. M. S. G. M. A. Hasnat, J. Bohne and L. Chen von misesfisher mixture model-based deep learning: Application to face verification. arXiv preprint arXiv:1706.04264, 2017 2017.

H. L. M. A. Jamal and B. Gong. Deep face detector adaptation without negative transfer or catastrophic forgetting. The IEEE Conference on Computer Vision and Pattern Recognition (CVPR), pp. 5608-5618, 2018. 2018.

R. C. M. Najibi, P. Samangouei and L. S. Davis. Single stage headless face detector. The IEEE International Conference on Computer Vision (ICCV), 2017 2017.

A. Nech and I. Kemelmacher-Shlizerman. Level playing field for million scale face recognition. In Conference on Computer Vision and Pattern Recognition (CVPR), 2017 2017.

J. P. H. P. Belhumeur and D. Kriegman. Eigenfaces vs. fisherfaces: Recognition using class specific linear projection. IEEE Trans. Pattern Analysis and Machine Intelligence, 19(7):711-720, 1997 1997.

R. H. S. Chopra and Y. LeCun. Learning a similarity metric discriminatively, with application to face verification. In Conference on Computer Vision and Pattern Recognition (CVPR), 2005 2005.

C. L. S. Yang, P. Luo and X. Tang. Wider face: A face detection benchmark. The IEEE Conference on Computer Vision and Pattern Recognition (CVPR), 2016 2016.

Z. L. H. S. X. W. S. Zhang, X. Zhu and S. Z. Li. Single shot scale-invariant face detector. The IEEE International Conference on Computer Vision (ICCV), 2017 2017.

M. A. Turk and A. P. Pentland. Face recognition using eigenfaces. In Conference on Computer Vision and Pattern Recognition (CVPR), 1991 1991.

Z. L. W. Liu and X. Tang. Spatio-temporal embedding for statistical face recognition from video. European Conference on Computer Vision (ECCV), 2006 2006.

Z. Y. W. Liu, Y. Wen and M. Yang. Large-margin softmax loss for convolutional neural networks. In International Conference on Machine Learning (ICML), 2016 2016.

X. Wang and X. Tang. A unified framework for subspace face recognition. IEEE Trans. Pattern Analysis and Machine Intelligence, 26(9):1222-1228, 2004 2004.

F. W. X. Cao, Y. Wei and J. Sun. Face alignment by explicit shape regression. IJCV, pp. 177-190,, 2014 2014.

S. C. X. Zhe and H. Yan. Directional statistics-based deep metric learning for image classification and retrieval. arXiv preprint arXiv:1802.09662, 2018 2018.

X. Xiong and F. D. la Torre. Supervised descent method and its applications to face alignment. IEEE Conference on Computer Vision and Pattern Recognition (CVPR), pp. 532-539, 2013 2013.

X. W. Y. Sun and X. Tang. Deep learning face representation from predicting 10,000 classes. In Conference on Computer Vision and Pattern Recognition (CVPR), 2014 2014.

X. W. Y. Sun and X. Tang. Deeply learned face representations are sparse, selective, and robust. In Conference on 2015.

X. W. Y. Sun, D. Liang and X. Tang. Deepid3: Face recognition with very deep neural networks. CoRR, abs/1502.00873, 2015 2015.

X. W. Y. Sun, Y. Chen and X. Tang. Deep learning face representation by joint identification-verification. In Advances in Neural Information Processing Systems (NIPS), 2014 2014.

M. R. Y. Taigman, M. Yang and L. Wolf. Deepface: Closing the gap to human-level performance in face verification. In Conference on Computer Vision and Pattern Recognition (CVPR), 2014 2014.

Z. L. Y. Wen, K. Zhang and Y. Qiao. A discriminative feature learning approach for deep face recognition. In European Conference on Computer Vision (ECCV), pp. 499-515, 2016 2016.

(56) References Cited

OTHER PUBLICATIONS

J. Y. F. W. X. W. Yu Liu, Hongyang Li and X. Tang. Recurrent scale approximation for object detection in cnn. The IEEE International Conference on Computer Vision (ICCV), 2017 2017.
D. L. Z. Li and X. Tang. Nonparametric discriminant analysis for face recognition. Transactions on Pattern Analysis and Machine Intelligence, 31:755-761, 2009. 2009.
D. L. Z. Li, W. Liu and X. Tang. Nonparametric subspace analysis for face recognition. In Conference on Computer Vision and Pattern Recognition (CVPR), 2005 2005.
Y. F. R. F. Y.-G. J. Z. Wang, K. He and X. Xue. Multi-task deep neural network for joint face recognition and facial attribute prediction. n Proceedings of the 2017 ACM on International Conference on Multimedia Retrieval (ICMR), 2017 2017.

* cited by examiner

ADAPTIVE IMAGE CROPPING FOR FACE RECOGNITION

FIELD

The present application relates generally to face recognition and, more specifically, to adaptive cropping of images in the context of extracting features of a face in the image, where the features are used in face recognition.

BACKGROUND

A facial recognition system is a technology capable of identifying or verifying a person from a digital image or a video frame from a video source.

Face recognition has been extensively researched in computer vision Recently, face recognition systems that perform face recognition have been greatly improved through the use of Convolutional Neural Networks operating in conjunction with deep learning.

BRIEF DESCRIPTION OF THE DRAWINGS

Reference will now be made, by way of example, to the accompanying drawings which show example implementations; and in which.

DETAILED DESCRIPTION

Figure 1:
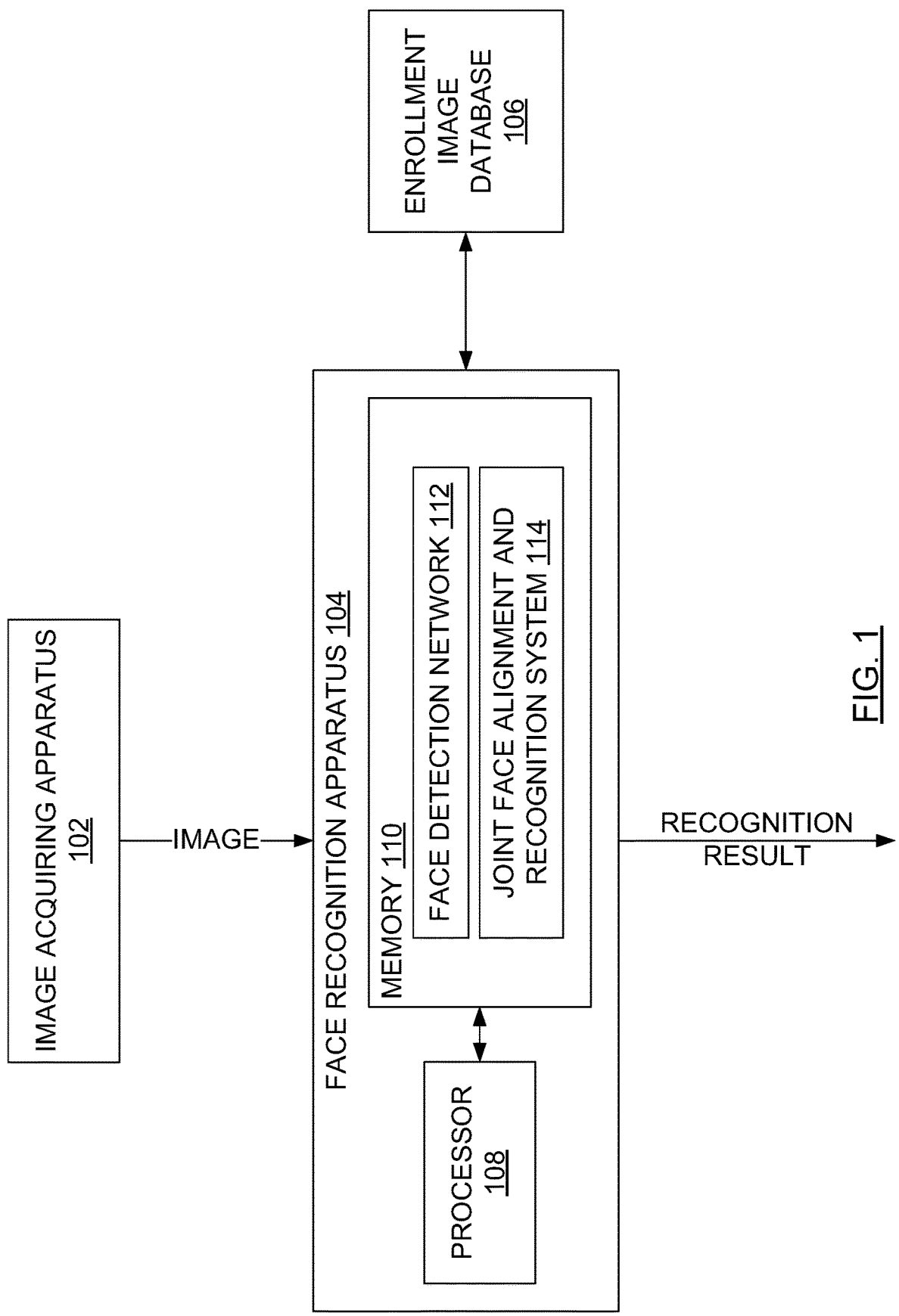
FIG. 1 illustrates a face recognition apparatus according to an aspect of the present application.

Existing face recognition system includes a face detection network and a face recognition network. Typically, the face detection network passes an image of a face to the face recognition network. The face recognition network extracts features of the face in the image of the face received from the face detection network. The face recognition network outputs an "embedding," which is a multi-dimensional vector of real values that is used to define the features of the face in the image. A further element (not shown) may compare an output embedding to a data set of embeddings associated with known faces.

The image of the face passed from the face detection network to the face recognition network may be understood to be associated with a bounding box. The manner in which the bounding box is defined determines the extent to which the face is aligned in the image and the extent to which there is a margin around the face.

In many cases, an error on the part of the face detection network, such as an error in aligning the face in the image, propagates into the face recognition network.

Unfortunately, existing face recognition systems do not optimize and align the images in one network. Indeed, most existing face recognition systems have a network for face recognition and a network that acts to detect and extract key points of faces. Then, using an equation, these networks align the input image.

Consequently, existing face recognition systems do not provide an optimal margin for the face recognition network.

Aspects of the present application may be shown to improve the margin and alignment of an image of a face from any face detection algorithm for use in a face recognition task.

It may be shown that performance of a system combining a face detection network and a face recognition network tends to be optimized when the alignment approach used in the face detection network is the same as the alignment approach used in the face recognition network. However, in practice, different alignment approaches often are employed in the two networks.

Aspects of the present application relate to an integrated and general approach to simultaneously extracting face features and improving alignment. Other aspects of the present application relate to improving the bounding box of the face image before passing the face image to the face recognition network.

A capability to improve the margin and the alignment of source images, represented as bounding box improvement in accordance with aspects of the present application, may be shown to enhance the accuracy of any face recognition network.

The face recognition methods discussed in the present application are based on feature embedding for the face image, which feature embedding may be found in existing patents and published patent applications. Determination of a feature map using principle component analysis (PCA) is proposed in U.S. Pat. No. 7,515,740. Face recognition using FISHERFACES kernel is proposed in U.S. Pat. No. 7,054,468. In Chinese Patent Application Publication CN104866810A, a face recognition method is proposed based on a deep convolutional neural network. A face recognition method and apparatus is described in US Patent Application Publication No. 2016/0379041A1 and US Patent Application Publication No. 2017/0046563A1. In US Patent Application Publication No. 2017/0262695A1, a system for face detection, representation and recognition is proposed.

Aspects of the present application act to perform bounding box adjustment on images that are to be re-input into a face recognition network. The output of the face detection network includes an initial bounding box for use in a face recognition network. Aspects of the present application act to improve the bounding box that is produced by the face detection network and to the point wherein the bounding box has been optimized for the face recognition task.

In overview, aspects of the present application relate to a Joint Face Alignment and Recognition system 114 that includes a face recognition network, a side network and providing a new loss function for training the Joint Face Alignment and Recognition system 114. In aspects of the present application, the side network can adjust the margin of an image of a face with a bounding box output from a face detection network.

According to an aspect of the present disclosure, there is provided a method of operating a face recognition system, the face recognition system including a side network and a face recognition network arranged to receive a cropped image of a face and produce an embedding vector representative of features of the face, the face recognition network implemented as a convolutional neural network including a series connection of a plurality of face recognition convolutional blocks terminating at a face recognition fully connected network, the cropped image of the face having a cropped bounding box relative to an original bounding box of an original image of the face. The method includes receiving, at the side neural network, output from selected face recognition convolutional blocks among the plurality of face recognition convolutional blocks, processing, at the side neural network, the output to produce relative bounding box values and employing the relative bounding box values to define a new bounding box for the image. In other aspects of the present application, a face recognition apparatus comprising a processor is configured for carrying out this method and a computer readable medium is provided for adapting a processor in a face recognition apparatus to carry out this method.

Other aspects and features of the present disclosure will become apparent to those of ordinary skill in the art upon review of the following description of specific implementations of the disclosure in conjunction with the accompanying figures.

FIG. 1 illustrates a face recognition apparatus 104 according to at least one example aspect of the present application. An image acquiring apparatus 102, for example, a camera, may capture an image of a face and transmit the image including the face to the face recognition apparatus 104. The face recognition apparatus 104 may perform face recognition by comparing features found in the image to features found in enrollment images stored, in advance, in an enrollment image database 106. In one example, a user of the face recognition apparatus may enroll an image of a user's face. The enrollment image database 106 may store the image of a user's face as an enrollment image. The face recognition apparatus 104 is illustrated as including a processor 108 and a memory 110. The memory 110 stores instructions for implementing a face detection network 112 and a Joint Face Alignment and Recognition system 114.

Figure 2:
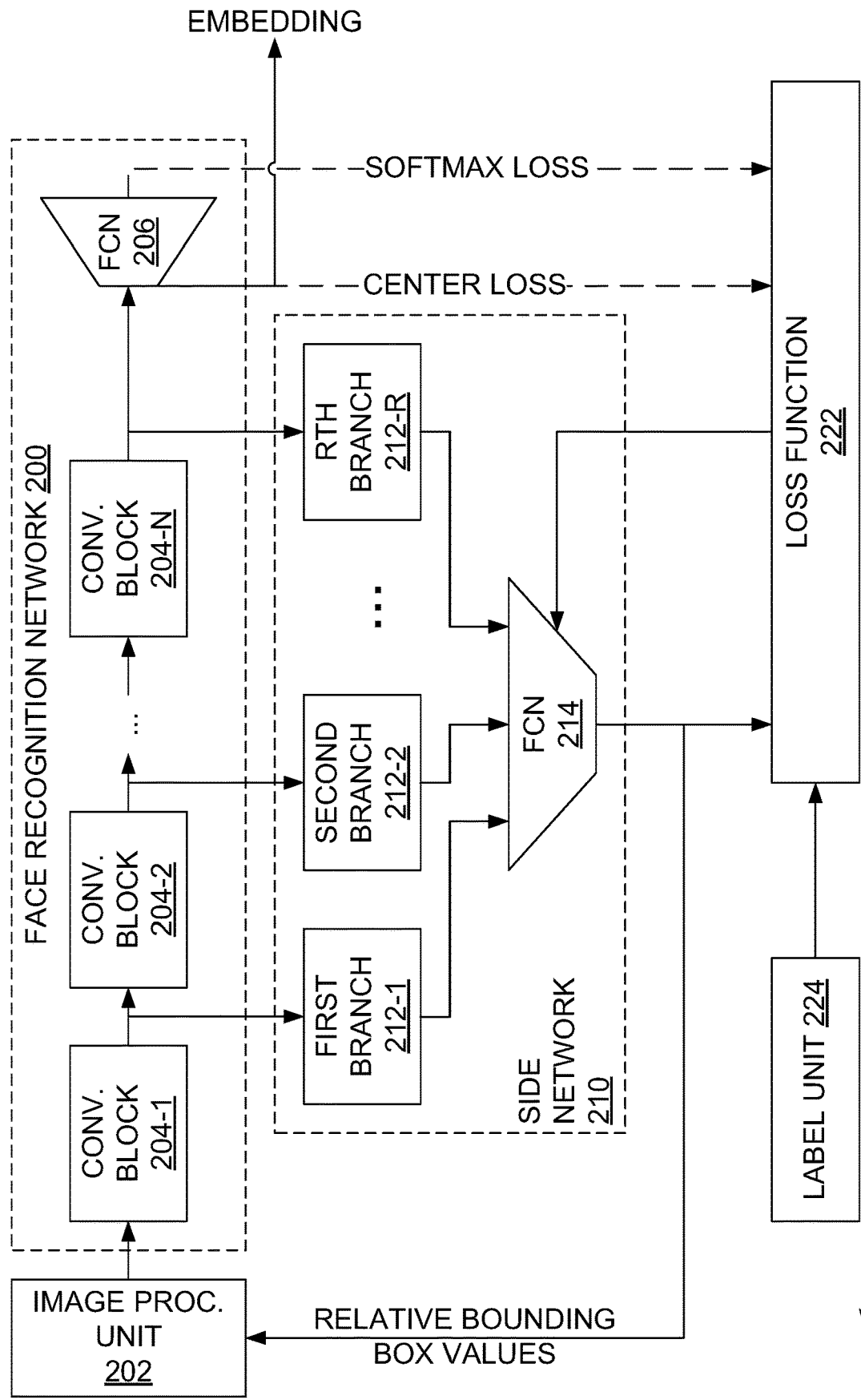
FIG. 2 illustrates a joint face alignment and recognition system that may be implemented in the face recognition apparatus of FIG. 1 according to an aspect of the present application, the joint face alignment and recognition system includes an image processing unit, a face recognition network and a side network having multiple branches.

The face recognition apparatus 104 may implement the Joint Face Alignment and Recognition system 114 as illustrated in FIG. 2.

The Joint Face Alignment and Recognition system 114 illustrated in FIG. 2 includes a face recognition network 200. The Joint Face Alignment and Recognition system 114 illustrated in FIG. 2 also includes various elements designed to optimize the bounding box of the face image that is passed to the face recognition network 200. Such elements include a side network 210, an image processing unit 202 and a loss function 222. The face recognition network 200 is connected so as to receive input from the image processing unit 202. In some implementations, the image processing unit 202 may be part of the side network 210.

As is conventional, the face recognition network 200 includes a series of convolutional blocks including: a first convolutional block 204-1; a second convolutional block 204-2; . . . ; and an Nth convolutional block 204-N. Collectively or individually the convolutional blocks may be referenced with reference numeral 204. The series of convolutional blocks 204 terminates at a face recognition network fully connected network 206. As is known, a generic fully connected network has nodes. A node is a computational unit that has one or more input connections, each input connection associated with a respective weight or bias, an activation function that combines the inputs in some way and an output connection. The nodes may also be called neurons, thereby leading to the name "neural network." The nodes are arranged within the generic fully connected network in layers: a first (input) layer; one or more hidden layers; and a last (output) layer. In accordance with aspects of the present application, the nodes of the first layer and the nodes of the hidden layers of the face recognition network fully connected network 206 implement a ReLU activation function and the nodes of the last layer implement a softmax activation function.

In the face recognition network 200, the first convolutional block 204-1 is connected, on an input side, to the image processing unit 202 and is connected, on an output side, to the second convolutional block 204-2. In turn, the second convolutional block 204-2 is connected, on an input side, to the first convolutional block 204-1 and, on an output side, to a subsequent convolutional block 204. In turn, the Nth convolutional block 204-N is connected, on an input side, to a preceding convolutional block 204 and is connected, on an output side, to the face recognition network fully connected network 206.

The side network 210 includes a first branch 212-1, a second branch 212-2, . . . , and an Rth branch 212-R. Collectively or individually the branches may be referenced with reference numeral 212. In the implementation illustrated in FIG. 2, the first branch 212-1 is connected, on an input side, to the output side of the first convolutional block 204-1 and, on an output side, to a side network fully connected network 214. The second branch 212-2 is connected, for example, on an input side, to the output side of the second convolutional block 204-2 and, on an output side, to the side network fully connected network 214. The Rth branch 212-N is connected, on an input side, to the output side of the Rth convolutional block 204-R and, on an output side, to the side network fully connected network 214.

In one example implementation, the face recognition network 200 is implemented according to the known "Inception ResNet V1." In another example implementation, the face recognition network 200 is implemented according to the known "ResNet 64." The side network 210 may be customized for each implementation of the face recognition network 200. The implementation with "Inception ResNet V" and a corresponding customized side network 210 may be called "JFA-Inception ResNet V1." The implementation with "ResNet 64" and a corresponding customized side network 210 may be called "JFA-ResNet64." In each implementation, "JFA" is an acronym representative of the phrase Joint Face Alignment.

Figure 3:
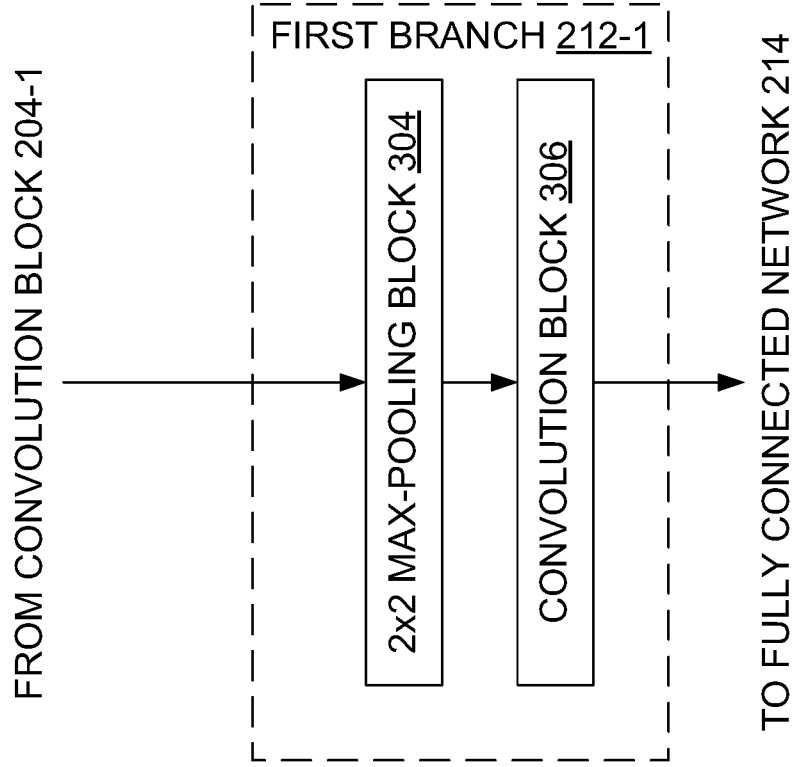
FIG. 3 illustrates a first branch of the side network of FIG. 2 according to an aspect of the present application.

For the JFA-Inception V1 network, the side network 210 has three branches. As illustrated in FIG. 3, the first branch 212-1 includes a 2×2 max-pooling block 304 connected to the output of first convolutional block 204-1 of the Inception ResNet V1 implementation of the face recognition network 200. The max-pooling block 304 has stride 2. The max-pooling block 304 is followed by a convolutional block 306. The convolutional block 306 has 256 filters of size 3×3.

Figure 4:
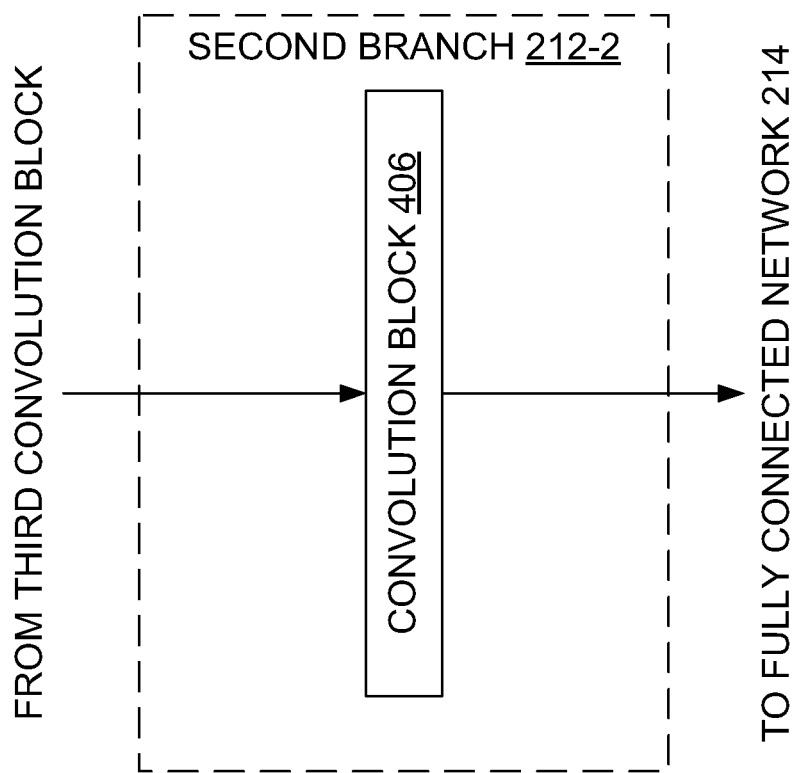
FIG. 4 illustrates a second branch of the side network of FIG. 2 according to an aspect of the present application.

As illustrated in FIG. 4, the second branch 212-2 includes a convolutional block 406 with 256 filters of 4×4. The convolutional block 406 is connected to a third convolution block (not shown) of the Inception ResNet V1 implementation of the face recognition network 200.

Figure 5:
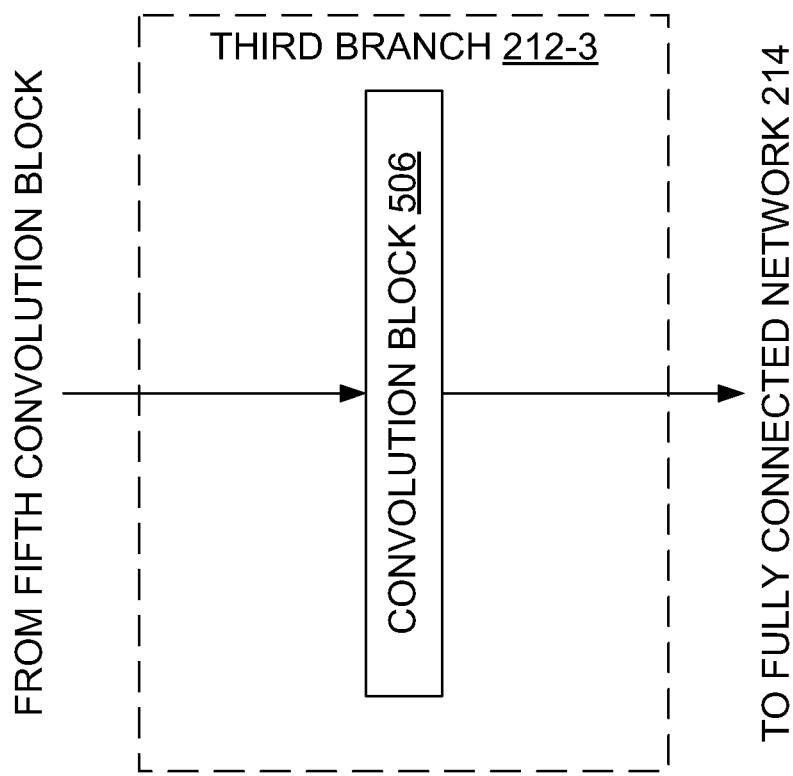
FIG. 5 illustrates a third branch of the side network of FIG. 2 according to an aspect of the present application.

As illustrated in FIG. 5, a third branch 212-3 of the side network 210 includes a convolutional block 506 with 256 filters of size 5×5 connected to a fifth convolution block (not shown) of the Inception ResNet V1 implementation of the face recognition network 200.

Notably, a generic branch 212 may include a combination of resizing blocks, max-pooling blocks and convolution blocks.

The output of the three branches 212-1, 212-2, 212-3 are concatenated into a combined output vector. A 1×1 convolution block (not shown) is applied on the combined output vector, the output of the 1×1 convolution block is flattened and the side network fully connected network 214 maps the output of the 1×1 convolution block to four outputs: $z_1$; $z_2$; $z_3$; and $z_4$. As will be discussed hereinafter, four outputs may be used for estimating the coordinates of corners of a refined bounding box.

For the JFA-ResNet 64, the side network 210 is implemented with three branches 212. The first branch 212-1 is connected to the output of the first convolutional block 204-1 of the ResNet 64 implementation of the face recognition network 200. The second branch 212-2 is connected to the output of the third convolutional block (not shown) of the ResNet 64 implementation of the face recognition network 200. The third branch (not shown) is connected to the output of the fifth convolutional block (not shown) of the ResNet 64 implementation of the face recognition network 200.

The output of the three branches 212 are concatenated into a combined output vector. A 1×1 convolution block (not shown) is applied on the combined output vector, the output of the 1×1 convolution block is flattened and the side network fully connected network 214 maps the output of the 1×1 convolution block to four outputs: $z_1$; $z_2$; $z_3$; and $z_4$.

Figure 6:
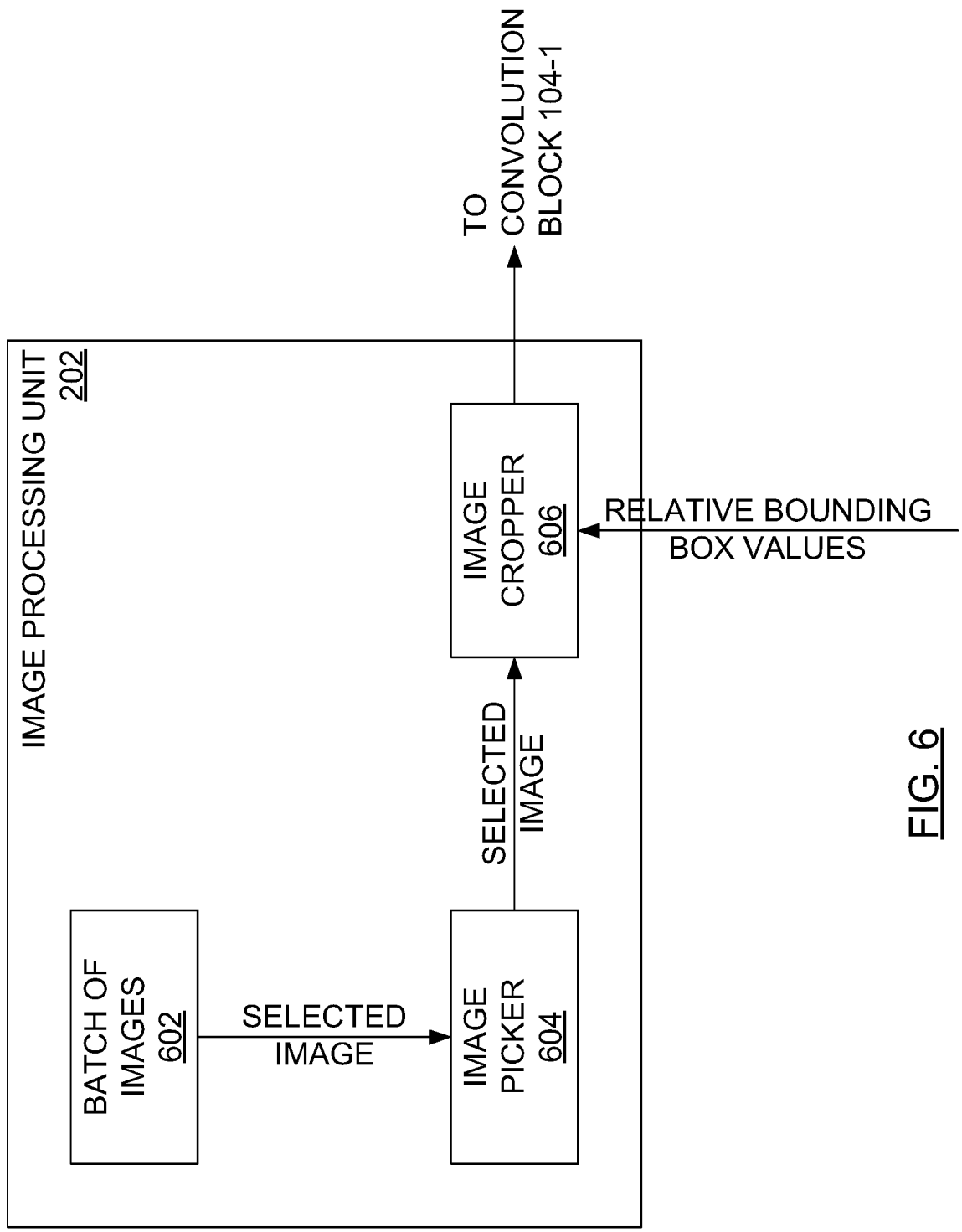
FIG. 6 illustrates the image processing unit of FIG. 2 according to an aspect of the present application.

FIG. 6 illustrates an example arrangement for the image processing unit 202. In the arrangement of FIG. 6, the image processing unit 202 includes a batch of images 602 connected to an image picker 604, which, in turn, is connected to an image cropper 606. The image cropper 606 is also connected to the side network fully connected network 214 and to the first convolutional block 204-1.

In operation, in the face recognition network 200, the first convolutional block 204-1 receives an image from the image processing unit 202 and passes output to the second convolutional block 204-2. In turn, the second convolutional block 204-2 passes output to a subsequent convolutional block 204. In turn, a preceding convolutional block 204 passes output to the Nth convolutional block 204-N. The Nth convolutional block 204-N passes output to the face recognition network fully connected network 206. As is conventional, the image from the image processing unit 202 has properties such as a width, in pixels, and a height, in pixels and, perhaps, several color channels. The output passed by the Nth convolutional block 204-N to the face recognition network fully connected network 206 is expected to be a vector of a predetermined number of elements matching the number of inputs nodes in the face recognition network fully connected network 206.

The face recognition network fully connected network 206 receives, at the first layer, the vector from the Nth convolutional block 204-N. The face recognition network fully connected network 206 processes the received vector to generate a feature embedding. The layer of nodes that precedes the softmax layer, in the face recognition network fully connected network 206, may be called a feature layer. It is the feature layer that produces the feature embedding.

As indicated hereinbefore, the nodes in the last layer of the face recognition network fully connected network 206 implement a softmax activation function. Accordingly, it may be understood that the face recognition network fully connected network 206 produces a cross entropy loss. The cross entropy loss for the last (softmax) layer is referred to herein as "softmax loss." It is notable that relying upon the softmax loss of a deep convolutional neural network usually does not allow for making useful improvements to the accuracy of the embedding.

To address this problem, several loss functions have been considered, including those loss functions known as: center loss; large margin softmax loss; angular softmax loss; and triplet loss. As is known, these loss functions aim to maximize inter-class distances and minimize intra-class distances.

Although the triplet loss, center loss, large margin softmax loss and angular softmax loss usefully impact the training of network of the type of the face recognition network 200, such losses are typically applied on the feature layer and the last layer. Still, all these losses are constrained based on the embedding vectors, while the early layers construct the feature layer. Hence, a loss function that can affect the early layers can accelerate the training and also improve the accuracy.

In aspects of the present application, a structure induces a discrimination power of the feature layer to the early layers.

In particular, the discriminatory power of the feature embedding may be improved using a face alignment and detection approach. Unlike the loss functions referenced hereinbefore, which loss functions consider the features at the output of the Nth convolutional block 204-N, the approach found in aspects of the present application is based on consideration of a plurality of the convolutional blocks 204.

In this approach, it may be shown that estimating some parameters of the probability distribution function of the data can improve the accuracy of the softmax layer in the face detection network fully connected network 206.

A relationship between estimation and classification in the early convolutional blocks 204 of the face recognition network 200 may be improved, thereby leading to construction of a more powerful feature vector. The side network 210 is arranged to align the input image for a subsequent pass to the face recognition network 200 for the extraction of the embedding. The side network 210 also generates a feature vector as part of estimating the bounding box. The feedback loop represented by the passage of output from the side network 210 to the image processing unit 202 acts to refine the bounding box of the input face image to improve the bounding box for the face recognition network 200.

The face recognition network 200 is expected to be implemented as a deep convolutional neural network for face recognition, with softmax as its last layer and a center loss available from the feature layer.

Aspects of the present application may be shown to achieve an objective of improving a relationship between bounding box estimation and classification in the convolutional blocks 204 of the face recognition network 200 and, thereby, produce more powerful feature vectors for overall improved recognition. This objective is achieved by using the side network 210 to detect faces and return refined bounding boxes.

During training, weights and biases in use in the Joint Face Alignment and Recognition system 114 adjusting based on optimizing loss functions determined while processing training data, the image with the refined bounding box is returned to the face recognition network 200 for improved learning of face features.

Subsequently, at test time, the image with the refined bounding box can be used for improved inference. The process is iterative, so that improved feature vectors can lead to improved bounding box estimation, which, in turn, leads to ever more refined feature vectors.

It is known that training neural networks may be based on a sequence that involves stages known as Feedforward, Loss and Backpropagation. The Loss stage involves determining a value of a loss function. The Backpropagation stage involves adjusting aspects of the neural network being trained in an attempt to minimize the value of the loss function.

It may be shown that the loss function plays an important role in training face recognition networks, such as the face recognition network 200. To train the convolutional blocks 204 of the face recognition network 200 and the branches of the side network 210, consider a multi-class classification problem with M classes. In such a problem, the cross entropy for the softmax layer is given by $$L_s = \frac{1}{N} \sum_{i=1}^{N} -\log\left(\frac{e^{f_{y_i}}}{\sum_{m=1}^{M} e^{f_{m_i}}}\right) \quad (1)$$

where $y_i$ is the true label of ith data and $f_{m_i}$ represents an activation function of the mth fully-connected layer of the ith data in the last layer of the face recognition network 200.

It is known that, to improve the accuracy of the softmax layer, a margin may be added to the activation of the true label to improve the training of the softmax after a normalization of feature vectors and the weights of the last layer. The result of the addition of the margin is called Large Margin Cosine Loss (LMCL), denoted $L_{ms}$ and determined as follows:

$$L_{ms} = \frac{1}{N} \sum_{i=1}^{N} L_{ms_i} \quad (2)$$

$$= \frac{1}{N} \sum_{i=1}^{N} -\log\left(\frac{e^{s(f_{y_i}-m)}}{e^{s(f_{y_i}-m)} + \sum_{m_i \neq y_i}^{M} e^{sf_{m_i}}}\right)$$

where s is a surface scale parameter and m is a margin added to the softmax loss. In this equation $L_{ms_i}$ is the LMCL for the ith input.

Although the margin is added to improve the power of discrimination of the feature, we can directly add the center loss to the feature layer to improve the feature layer. Assume that the feature layer, which is the last layer before the softmax layer in the face detection network fully connected network 206. Also assume that the feature layer is denoted by $x_i$ for the ith data. Based on these assumptions, the center loss may be given by:

$$L_{cl} = \frac{1}{M} \sum_{i=1}^{M} \frac{1}{N_m} \sum_{m} \|x_{m_i} - c_m\|^2 \quad (3)$$

where $c_{m_i}$ is the center of class of m and $x_{m_i}$ s the feature of the ith data that belongs to the mth class. $N_m$ is the number of data that belong to the mth class and M is the total number of classes. The center loss in Equation (3) represents an average of variance of feature vectors.

A face recognition, "fr", loss function, $L_{fr}$, for the face recognition network 200 may be determined by combining Equation (2) and Equation (3), as follows:

$$L_{fr} = L_{ms} + \lambda L_{cl} \quad (4)$$

The side network 210 ideally returns, to the image processing unit 202, a "true" bounding box for the input image.

Figure 7:
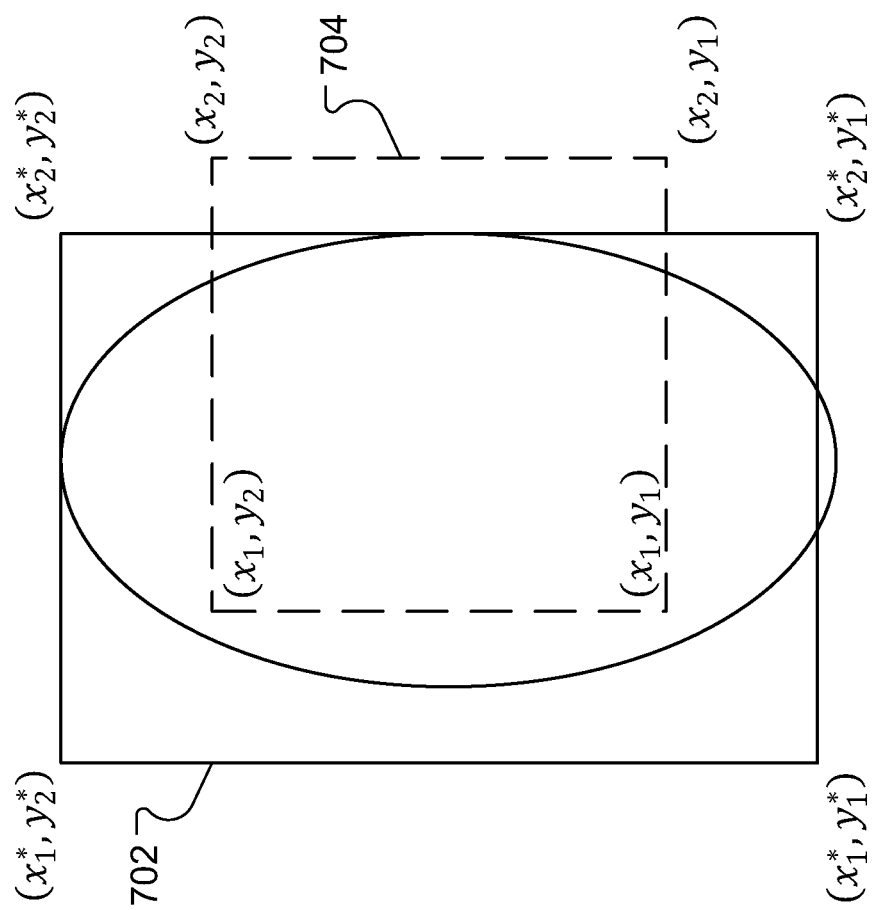
FIG. 7 illustrates a spatial relationship between a pair of bounding boxes.

In FIG. 7, a true bounding box 702 is illustrated. During training, a new, randomly cropped bounding box 704 may be selected for the ith face data.

It follows that, if an image is cropped badly or in an improper manner for the face recognition task, the side network 210 returns value that allow for determination of a bounding box close to the "true" bounding box that needs to be applied to the image. Thus, the refined version of image is constructed and applied to the face recognition network 200. Consider an input face image that has been cropped relative to an original face image. The location of a bounding box 704 of the cropped face image defined according to four pairs of coordinates as $\{(x_1,y_1), (x_1,y_2), (x_2,y_1), (x_2,y_2)\}$. Notably, the true bounding box 702, that is, a bounding box that was used to train the face recognition network 200, may be defined according to four pairs of coordinates as $\{(x_1^*,y_1^*),(x_1^*,y_2),(x_2^*,y_1^*),(x_2^*,y_2)\}$. The goal of the side network 210 is to estimate $(x_i,y_j^*)$ from the input image and the geometry of the input image. In the following, variables w and h are used to represent a width and a height of a given image, respectively. For the given image, the side network 210 determines $x_1,x_2,y_1,y_2$ and the following relative bounding box values as follows:

$$z_1 = \frac{x_1 - c_x}{w}, \quad (5)$$

$$z_2 = \frac{x_2 - c_x}{w},$$

$$z_3 = \frac{y_1 - c_y}{h},$$

$$z_4 = \frac{y_2 - c_y}{h},$$

where $c_x = \frac{1}{2}(x_1+x_2)$ and $c_y = \frac{1}{2}(y_1+y_2)$. Consider the output of the side network 210 as a vector with length of four relative bounding box values, $\{z_1, z_2, z_3, z_4\}$. A mean square error (MSE) may then be applied for refining the bounding box. The MSE may be denoted as $L_{bx}$ and may be used when estimating the values in Equation (5), as follows:

$$L_{bx} = \frac{1}{N} \sum_{i=1}^{N} L_{bx_i} \quad (6)$$

$$= \frac{1}{N} \sum_{i=1}^{N} \frac{1}{4} \sum_{k=1}^{4} (f_{s_i,k} - z_{i,k})^2,$$

where $z_{i,k}$ may be determined based on $z_k$ for the ith input and $f_{s_i,k}$ is the kth output of the side network 210 for the ith input data and, finally, the term $L_{bx_i}$ is used to represent the MSE loss for the ith input.

During the inference, the image processing unit 202 may determine estimations of $x_i^*$ and $y_i^*$ as follows:

$$\widehat{x_1^*} = w f_{s_1} + c_x,$$

$$\widehat{x_2^*} = w f_{s_2} + c_x,$$

$$\widehat{y_1}^* = wf_{s_3} + c_y,$$

$$\widehat{y_2}^* = wf_{s_4} + c_y. \quad (7)$$

Notably, the ideal output of the side network 210 are the values $\{z_1, z_2, z_3, z_4\}$. However, the values $\{f_{s1}, f_{s2}, f_{s3}, f_{s4}\}$ are the actual output of the side network 210 as the side network 210 attempts to steadily improve estimates of the value $\{z_1, z_2, z_3, z_4\}$. The relative bounding box values, $\widehat{x_1}^*$, $\widehat{x_2}^*, \widehat{y_1}^*, \widehat{y_2}^*$, may be used, by the image processing unit 202, to establish a refined bounding box for the image provided to the face recognition network 200. Hence, during the inference, for each image, the input image and its bounding box is improved by the side network 210. Then, the new bounding box crops the face image and is fed to the face recognition network 200 again. This process may be considered to be iterative, such that each successive iteration improves the bounding box. Simulations have illustrated that two iterations are often suitable, even for a very badly cropped face image.

A total loss function for the ith input may be denoted by $L_{t_i}$ and may be determined, at the loss function 222, as a linear combination of three losses: $L_{ms_i}$; $L_{bx_i}$; and $L_{cl}$. The convex hull of $L_{ms_i}$ and $L_{bx_i}$ may be represented as follows:

$$L_{t_i} = \eta_i L_{ms_i} + (1-\eta_i) L_{bx_i} \quad (8)$$

where $\eta_i$ is a so-called "hyperparameter" having a real value between zero and one. In the training phase, the hyperparameter, $\eta_i$, may be set, for each batch of images, based on a ratio of badly cropped images to well cropped images. Accordingly, the expression in Equation (4) may be expanded, based on Equation (8) to be given by:

$$L_t = \frac{1}{N}\sum_{i=1}^{N} L_{t_i} + \lambda L_{cl}. \quad (9)$$

During the training, the badly cropped images are generated by a data augmentation unit (as part of the image cropper 606, see FIG. 6). In those circumstance wherein a ratio of total cropped image from the original face cropped is given, the given ratio may be used for $\eta_i$ when determining a total loss using Equation (9) for each image. The training starts with a $\eta_i$ that is close to one.

For any face image, the bounding box does not change the identity of the person to whom the face belongs. Based on this fact, consider a face data point from a given identity named $c_i$. The face data point may be denoted by x. Moreover, consider the group of transformations of all possible bounding box cropping transformations to be denoted by G. Then, a probability that x belongs to $c_i$ may be expressed as a probability that g(x) belongs to $c_i$, for any $g \in G$. Accordingly, it may be stated that the bounding box transformation does not change the identity. Thus, the probability density function of faces is invariant with respect to G. To implement a classifier function that is invariant with respect to G, it can be shown that the classifier function should be a function of a maximal invariant statistic. A statistic denoted by m(x) may be considered to define a maximal invariant statistic if the statistic satisfies two conditions: 1) a condition wherein the statistic has an invariance property, such that, for any $g \in G$, m(g(x))=m(x); and 2) a condition wherein the statistic has maximality, wherein, for the statistic to have maximality, for any $x_1$ and $x_2$, chosen such that $m(x_1)=m(x_2)$, then there exists a $g \in G$, for which $x_2 = g(x_1)$.

Consider a bounding box applied on a face image may be represented as a classifier function, g. Accordingly, the operation to refine the bounding box can be considered an operation to approximate a maximal invariant statistic. This holds true because the two conditions, discussed hereinbefore, that define a maximal invariant statistic are satisfied by the operation that refines the bounding box. To satisfy the first condition, wherein the statistic has an invariance property, it may be illustrated that a face data point within a refined bounding box is also within the bounding box before refinement. To satisfy the second condition, wherein the statistic has maximality, it may be illustrated that a face data point in the refined bounding box is same for a first cropping and a second cropping of the same face image, then there exists a cropping that can convert one cropping to another.

Upon study of a relationship between the softmax loss and the center loss, it can be illustrated that these two losses can improve each other. A relationship between $L_{bx}$ and the accuracy of softmax may also be studied.

The operation to refine the bounding box involves estimating face alignment parameters for the input face image.

It may be illustrated that the estimation of face alignment parameters is useful when carrying out operations to improve the bounding boxes for images provided to the face recognition network 200. It may also be illustrated that the estimation of face alignment parameters may be helpful to the convolution blocks 204 during training to improve the accuracy of the softmax layer.

Consider Maximum Likelihood loss. The target of the training is to maximize the conditional probability of a plurality of labels, y, (provided by a label unit 224, see FIG. 2) given a particular x, that is:

$$\operatorname*{argmax}_{y \in Y}[\ln(p_\theta(y|x))]$$

where θ represents parameters for a Probability Distribution Function (PDF) of the labels, y, given the particular x and where Y is a set of all possible y. Since $p_\theta(y|x)$ is maximized, the gradient of $p_\theta(y|x)$ may be set to zero during training. A Taylor series may be used as an approximation of a gradient $\nabla_\theta \ln(p_\theta(y|x))$ with respect to expansion around the maximum likelihood of θ. A further approximation may be accomplished by only using the first two terms of the Taylor series of the gradient $\nabla_\theta \ln(p_\theta(y|x))$. It can be shown that, for the maximum likelihood of θ, $\nabla_\theta \ln(p_\theta(y|x))=0$. The second term of the Taylor series may be determined as the derivative of $\nabla_\theta \ln(p_\theta(y|x))$ with respect to θ. Thus, we can approximate $\nabla_\theta \ln(p_\theta(y|x))$ as follows:

$$\nabla_\theta \ln(p_\theta(y|x)) = I(\theta)(g(x,y) - \theta), \quad (10)$$

where $$I(\theta) = \frac{\partial \nabla_\theta \ln(p_\theta(y|x))}{\partial \theta} \frac{\partial^T \nabla_\theta \ln(p_\theta(y|x))}{\partial \theta}. \quad (11)$$

It can be shown that the function I(θ) tends to the known Fisher Information Matrix of θ when the set of input data points, x, is an independent and identically distributed data set.

The $L^2$ norm (also called Euclidean norm, Euclidean distance and $L^2$ distance) of $\nabla_\theta \ln(p_\theta(y|x))$ may be considered to be follows:

$$\|\nabla_\theta \ln(p_\theta(y|x))\| = \|I(\theta)(g(x,y) - 0)\| \le u \|g(x,y) - \theta\|, \quad (12)$$

where u is the upper bound of $I(\theta)$.

From Equation (12), it may be inferred that a Minimum Mean Squared Error (MMSE) θ improves the training of the Maximum Likelihood classifier. In other words, g(x,y) tends to the MMSE of θ to achieve the maximum likelihood classifier. Based on this result, if we have some information about a set of parameters of the PDF, then the Mean Squared Error (MSE) loss function improves the total accuracy of classifier.

The accuracy of the estimation of unknown parameters affects the accuracy of the classifier in Maximum Likelihood criteria. It follows that, to improve the accuracy of the face recognition network 200, a good strategy involves training the feature vectors of the convolution blocks 204 such that the parameters of the convolution blocks 204 tend to the MMSE of the unknown parameters. In this regards, we can consider that the center loss, $L_{cl}$, can be a naive implementation MSE for the Nth convolution block 204-N.

On the other hand, a reliable estimation of unknown parameters of the PDF can improve the performance of the softmax layer. It follows that the side network 210 that tries to estimate some alignment parameters of the face image can improve the training of the mid-layer feature vectors for the convolution blocks 204. Accordingly, not only is the side network 210 useful for bounding box refining but also, based on Equation (12), can improve the accuracy of the softmax layer.

In Equation (8), the parameter $\eta_i \in [0,1]$ controls the relative contribution of the face recognition and bounding box estimation to the loss function during training, Equation (9). In particular, if $\eta_i = 1$, the bounding box refining is not involved in the training. By decreasing $\eta_i$, the contribution of the ith sample in bounding box refining increases. It follows that, for cases with a complete face, the parameter $\eta_i$ is set to one and, for cases in which the faces is not complete, this parameter $\eta_i$ is set to a ratio of missed match of the input with the true face.

In FIG. 7, the true bounding box 702 is illustrated. During training, the new, randomly cropped bounding box 704 may be selected for the ith face data. The value for $\eta_i$ may be determined as:

$$\eta_i = \frac{A_{c,i}}{A_{t,i}} \quad (13)$$

where $A_{c,i}$ is the area of intersection between the cropped bounding box 704 and the true bounding box 702 and where $A_{t,i}$ s the area of the true bounding box 702 for the ith face image in the training.

The training may, for example, start with $\eta_i = 1$. Then, by increasing the number of epochs, the cropping of the input images is increased.

Aspects of the present application relate to an integrated approach to bounding box alignment and classification for face recognition based on training of a detection network that provides feature maps for both alignment and classification.

Probability distribution functions (PDFs) of faces have been analyzed to show that such PDFs have an invariability with respect cropping transformation. Awareness of such invariability allows for development of an iterative approach to bounding box refinement for face recognition.

Aspects of the present application relate to a relationship between an estimation loss function and a classification loss function and the combination of these two loss functions from the PDF of data and show that this term improves classification training.

The side network fully connected network 214 layer returns four relative bounding box values, $\{f_{s1}, f_{s2}, f_{s3}, f_{s4}\}$, making a new bounding box to replace the existing bounding box.

In training, for each image label of image that shows the identity of face with the correct bounding box are passed to the loss function 222.

In aspects of the present application, the side network 210 can find the optimal margin for face recognition network, such that the margin is selected by the network.

This product can be used in Smart phones or personal computer into high tech image composing capability Video Surveillance: Face search in a big data set for identification and verification purpose. This technique can be used in object detection or recognition that the input has been selected using a bounding box and the bounding box can be improved. Conveniently, aspects of the present application can be shown to improve any bounding box using the training data.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of operating a face recognition system, the face recognition system including a side network and a face recognition network arranged to receive a cropped image of a face and produce an embedding vector representative of features of the face, the face recognition network implemented as a convolutional neural network including a series connection of a plurality of face recognition convolutional blocks terminating at a face recognition fully connected network, the cropped image of the face having a cropped bounding box relative to an original bounding box of an original image of the face, the method comprising:
    receiving, at the side neural network, output from selected face recognition convolutional blocks among the plurality of face recognition convolutional blocks;
    processing, at the side neural network, the output to produce relative bounding box values; and
    employing the relative bounding box values to define a new bounding box for the image.

2. The method of claim 1, wherein the side network comprises a plurality of branches that implement one or more of a max-pooling block, a convolution block and a resizing block.

3. The method of claim 2, further comprising:
    concatenating, at the side neural network, output from each branch among the plurality of branches to, thereby, produce a combined output vector; and
    processing the combined output vector to, thereby, generate the relative bounding box values.

4. The method of claim 3 wherein the processing the combined output vector comprises applying a 1×1 convolution block to the combined output vector to, thereby generate 1×1 convolution block output.

5. The method of claim 4 further comprising flattening the 1×1 convolution block output.

6. The method of claim 1, wherein the side network comprises a branch that implements a max-pooling block and a side network convolutional block.

7. The method of claim 6 wherein the max-pooling block comprises a 2×2 max-pooling block connected to output from a first face recognition convolutional block of the plurality of face recognition convolutional blocks.

8. The method of claim 7 wherein the max-pooling block has stride 2.

9. The method of claim 4 wherein the side network convolutional block has 256 filters of size 3×3.

10. The method of claim 4 wherein the side network convolutional block is connected to output from the max-pooling block.

11. The method of claim 1 wherein the side network comprises a branch that implements a side network convolutional block with 256 filters of 4×4.

12. The method of claim 11 wherein the side network convolutional block is connected to a third face recognition convolutional block of the plurality of face recognition convolutional blocks.

13. The method of claim 1 wherein the side network comprises a branch that implements a side network convolutional block with 256 filters of size 5×5.

14. The method of claim 13 wherein the side network convolutional block is connected to a fifth face recognition convolutional block of the plurality of face recognition convolutional blocks.

15. A face recognition apparatus comprising:
a memory storing instructions; and
a processor configured, by executing the instructions, to:
implement a face recognition network, the face recognition network arranged to:
receive a cropped image of a face; and
produce an embedding vector representative of features of the face;
where the face recognition network is implemented as a convolutional neural network including a series connection of a plurality of face recognition convolutional blocks terminating at a face recognition fully connected network, the cropped image of the face having a cropped bounding box relative to an original bounding box of an original image of the face;
implement a side neural network to:
receive output from selected face recognition convolutional blocks among the plurality of face recognition convolutional blocks;
process the output to produce relative bounding box values; and
implement an image processing unit to:
receive the relative bounding box values; and
employ the relative bounding box values to define a new bounding box for the image.

16. The face recognition apparatus of claim 15, wherein the side network comprises a plurality of branches that implement one or more of a max-pooling block, a convolution block and a resizing block.

17. The face recognition apparatus of claim 16, wherein the processor is further configured to implement the side neural network to:
concatenate output from each branch among the plurality of branches to, thereby, produce a combined output vector; and
process the combined output vector to, thereby, generate the relative bounding box values.

18. A non-transitory computer-readable medium having instructions stored thereon, the instructions executable by a processor of a face recognition apparatus, the instructions causing the processor to:
implement a face recognition network, the face recognition network arranged to:
receive a cropped image of a face; and
produce an embedding vector representative of features of the face;
where the face recognition network is implemented as a convolutional neural network including a series connection of a plurality of face recognition convolutional blocks terminating at a face recognition fully connected network, the cropped image of the face having a cropped bounding box relative to an original bounding box of an original image of the face;
implement a side neural network to:
receive output from selected face recognition convolutional blocks among the plurality of face recognition convolutional blocks;
process the output to produce relative bounding box values; and
implement an image processing unit to:
receive the relative bounding box values; and
employ the relative bounding box values to define a new bounding box for the image.

19. The computer-readable medium of claim 18, wherein the side network comprises a plurality of branches that implement one or more of a max-pooling block, a convolution block and a resizing block.

20. The computer-readable medium of claim 19, wherein the instructions further cause the processor to:
concatenate output from each branch among the plurality of branches to, thereby, produce a combined output vector; and
process the combined output vector to, thereby, generate the relative bounding box values.

* * * * *

UNITED STATES PATENT AND TRADEMARK OFFICE
CERTIFICATE OF CORRECTION

PATENT NO.        : 10,872,258 B2  
APPLICATION NO.   : 16/355665  
DATED             : December 22, 2020  
INVENTOR(S)       : Ali Ghobadzadeh et al.

Page 1 of 1

It is certified that error appears in the above-identified patent and that said Letters Patent is hereby corrected as shown below:

In the Specification

In Column 7, Line 63 "where $c_{m_i}$ is the center of class of *m* and $x_{m_i}$ s the feature of" should read --where $c_{m_i}$ is the center of class of *m* and $x_{m_i}$ is the feature of--.

In Column 8, Lines 24-25 "$y_1$*) , ($x_1$* , $y_2$) , ($x_2$* , $y_1$*) , ($x_2$* , $y_2$)}. The goal of the side network 210 is to estimate ($x_i$, $y_j$*) from the input image and the" should read --$y_1$*) , ($x_1$* , $y_2$*) , ($x_2$* , $y_1$*) , ($x_2$* , $y_2$*)}. The goal of the side network 210 is to estimate $(x_i^*, y_j^*)$ from the input image and the--.

In Column 8, Line 64 to Column 9, Line 3 Equation 7 should appear as:

$$\widehat{x_1^*} = w f_{s_1} + c_{x'}$$

$$\widehat{x_2^*} = w f_{s_3} + c_{x'}$$

$$\widehat{y_1^*} = h f_{s_2} + c_{y'}$$

$$\widehat{y_2^*} = h f_{s_4} + c_{y'}$$

In Column 11, Line 51 "where $A_{c,i}$ s the area of intersection between the cropped" should read as --where $A_{c,i}$ is the area of intersection between the cropped--.

Signed and Sealed this  
Twenty-sixth Day of April, 2022

*Katherine Kelly Vidal*

Katherine Kelly Vidal  
*Director of the United States Patent and Trademark Office*